Patented July 21, 1953

2,646,399

UNITED STATES PATENT OFFICE 2,646,399

METHOD OF INHIBITING CORROSION OF METALS

William B. Hughes, Bartlesville, Okla., assignor to Cities Service Research and Development Company, New York, N. Y., a corporation of New Jersey No Drawing. Application December 28, 1950, Serial No. 203,200

8 Claims. (Cl. 252—8.55)

This invention relates to inhibiting corrosion of metals and is more particularly concerned with improved compositions and processes for treating natural oil-brine mixtures to reduce their corrosive action upon production, transmission, and other oil field equipment.

It is a well-known fact that many oil producing formations yield with the crude oil a brine which is extremely corrosive in its action upon metal tubing, casings, pumps and other oil producing and collection equipment; and that this type of corrosion is particularly noticeable in wells producing brines containing dissolved hydrogen sulfide, carbon dioxide, or other acidic materials. In the past, efforts have been made to reduce the cost of maintaining production and collection equipment by introducing into the well caustic soda or other alkaline solutions in such proportion as to neutralize the acidic components, or by the use of certain water-soluble corrosion inhibiting agents such as formaldehyde, bone oil, nitrogen bases of various types, amines, and combinations of these reagents. While these corrosion inhibitors are satisfactory at a number of locations when used in wells which produce little water as compared to the oil produced, their cost becomes prohibitive when used in wells producing large amounts of water, since the same concentration of the inhibitor must be maintained in the water phase in both types of wells in order to satisfactorily prevent corrosion of the equipment.

It is an object of this invention to provide oil-soluble compositions which may be economically employed in preventing corrosion in wells producing oil-brine mixtures, and especially in those producing large amounts of brine as compared to oil.

I have discovered that the products obtained by reacting, according to the method of Riebsomer (J. Org. Chem. 15, 241, 1950), two mols of a polyethylene amine such as diethylene triamine, triethylene tetramine, or tetraethylene pentamine with one mol of a dibasic acid having 8 or more carbon atoms, are very effective in inhibiting the corrosive action of oil and brines. The lower dibasic acids, such as malic, succinic, and the like, are generally not satisfactory for use in my process, since they apparently split during the reaction to give water-soluble derivatives of monobasic acids showing little or no corrosion inhibiting characteristics. These new compositions may be prepared by mixing the acid and the amine, and then heating to drive off water split off during the reaction. The compounds are oil-soluble and are effective to inhibit corrosion even when added in amounts as low as ten parts per million based on the oil produced by the well.

The compounds prepared as above may be further neutralized with oleic acid with only a slight loss of effectiveness. The oleic acid may be used in varying amounts up to that quantity necessary to neutralize to a methyl orange end point. In general, it is desirable to so neutralize the produce, since the cost of the neutralized material per pound is usually less than that of the dibasic acid-amine product.

As an example of the method by which my compositions may be prepared the following example is given, it being understood, however, that the exact conditions given in the example are not in any way critical.

EXAMPLE

To a mixture of 30 grams (0.1 mol) of dimerized linoleic acid prepared according to the directions given in Journal of American Oil Chemists Society, 24, 65 (March 1947) and hereafter referred to as dimer acid, and 29.2 grams (0.2 mol) of diethylenetriamine, 50 ml. of benzene was added. The mixture was heated under a water-trap condenser in order to distill the water-benzene azeotrope mixture, with the benzene being returned continuously through the decanter still head to the reaction mixture. After a four-hour reaction period, 6.8 grams of water had been collected, which was almost the theoretical quantity which would be split out by the reaction of the amine with both carboxyl groups of the dimerized acid to produce the bis-imidazoline. The benzene was removed by distillation and the resulting product was washed with water to remove excess amine. It was then returned to the reactor and dried by distillation with benzene.

The effectiveness of my compositions in inhibiting the corrosiveness of oil field brines may be better and more fully understood by reference to certain tests which I have conducted using natural brines taken from producing wells together with oil from the same well. The test procedure involved a measurement of the corrosive action of these well fluids as inhibited with the compositions described above upon thoroughly cleaned and polished strips of No. 18 gauge hot rolled steel strips ½ inch by 3¾ inches in size, under conditions closely approximating those existing in a producing oil well, and a comparison thereof with the results obtained by subjecting identical test strips to the corrosive action of well fluids alone.

Cleaned and numbered one-quart bottles were purged with natural gas. Oil, saturated with hydrogen sulfide by bubbling the gas through the liquid for about three hours, was added to the half-full mark on the bottle. Brine containing carbon dioxide, and also saturated with hydrogen sulfide was added to almost completely fill the bottle. A quantity of my new compounds was then added to each bottle in amounts ranging from 10 to 50 parts per million, based on the oil content of the bottle. The weighed steel strips were then affixed to the end of a glass rod in such a manner that two pieces of plastic laboratory tubing prohibited contact between the strip and the glass while a third piece of tubing held the strip firmly in position. The length of the glass rod was such that the midpoint of the test strip was approximately at the oil-brine interfacial level when the rod itself was held in the bottle by a tightly fitting one-holed rubber stopper.

At all times precautions were maintained to exclude air from the bottles by frequent and liberal purging with oxygen-free natural gas.

The bottles containing the oil, the brine, and the strips were then mounted upon the periphery of a horizontal drum, which was slowly revolved so as to alternately bring the surface of the steel strip in contact with the oil and with the brine. At the end of two weeks the bottles were taken off the drum and the strips removed. The strips were first washed in kerosene and then methanol, and finally water, prior to cleaning. Cleaning consisted of carefully treating in one weight per cent hydrochloric acid solution for a few seconds at a time, washing with water, and thoroughly wiping with cheese cloth between each acid treatment. When the original lustre had been restored as nearly as possible with a minimum amount of acid treating, the strips were again washed in methanol followed by acetone, and were then reweighed to determine the weight loss. Blank runs were, of course, made to provide a basis for comparison.

The changes in the weight of the test strips during the corrosion test were taken as a measurement of the effectivness of the inhibitor compositions. Thus a protection percentage may be calculated for each of the test strips taken from the inhibited well fluids in accordance with the following formula:

$$\frac{L1-L2}{L1} \times 100$$

in which L1 is the loss in weight of strips taken from uninhibited well fluids, and L2 is the loss in weight of strips which were subjected to the inhibited well fluids.

The results of these test calculations are summarized in the table in which TETA is triethylenetetramine, DETA is diethylenetriamine, and TEPA is tetraethylenepentamine. The first three columns of the table indicate the particular amines, dibasic acids, and neutralizing acid used in formulating the inhibitor tested, the fourth column indicates the molar proportions in which they were reacted, the fifth column indicates the protection afforded by each compound, and the sixth column indicates the parts per million of inhibitor based on the oil in the bottles.

*Table*

| 1 | 2 | 3 | 4 | 5 | 6 |
|---|---|---|---|---|---|
|   |   |   |   | Percent |   |
| DETA | Dimer Acid | Oleic | 2:1:3 | 75 | 25 |
| DETA | ...do... | ...do... | 2:1:3 | 89 | 50 |
| TETA | ...do... | None | 2:1 | 86 | 50 |
| TETA | ...do... | Oleic | 2:1:4 | 95 | 50 |
| TETA | Phthalic Acid | ...do... | 2:1:4 | 93 | 50 |
| DETA | Dimer Acid | None | 2:1 | 94 | 10 |
| DETA | ...do... | ...do... | 2:1 | 95 | 25 |
| DETA | ...do... | ...do... | 2:1 | 95 | 50 |
| DETA | ...do... | ...do... | 2:1 | 97.7 | 50 |
| TETA | Sebacic Acid | Oleic | 2:1:8 | 87 | 50 |
| TEPA | Dimer Acid | None | 2:1 | 92 | 50 |
| TEPA | ...do... | Oleic | 2:1:10 | 89 | 50 |

It will thus be evident that corrosion may be reduced to a value of one tenth or less of the corrosion due to the natural flow of well fluids through the well tubing and gathering lines, by the incorporation of very minor quantities of my new compounds in the well fluid.

In using my improved compositions for protecting oil well tubing, casing, and other equipment which comes in contact with the corrosive oil-brine production, it has been found that excellent results may be obtained by injecting an appropriate quantity of a selected composition into a producing well so that it may mingle with the oil-brine mixture and come into contact with the casing, tubing, pumps, and other producing equipment. I may, for example, introduce the inhibiting composition into the top of the casing, thus causing it to flow down into the well and thence back through the tubing, etc. In general, I have found that this procedure suffices to inhibit corrosion throughout the entire system of production and collection, even including field tankage.

The nature of the inhibiting action of my improved compositions is not fully understood, but apparently the compositions act to preferentially wet the surface of the metal equipment with oil, thus excluding brine from contact with the metal. In any event, however, no matter what the mechanics of the corrosion inhibiting may be, they are extremely and surprisingly effective in protecting metal parts from corrosion even when used in amounts of fifty parts per million or less based on the oil content of the well fluids.

It is to be understood that the improved compositions of my invention are not limited to use alone and may be employed along with other agents commonly introduced into producing oil wells for breaking emulsions, limiting scale formation, etc. It is further evident that my invention is not restricted to the use of improved compositions for inhibiting corrosion in oil wells but may be employed to perform this function in the presence of corrosive brines of other origin.

Having now described my invention, what I claim as new and useful is:

1. The method of protecting metal equipment which is subject to the corrosive action of oil well fluids which comprises adding to such fluids the product obtained by reacting one mol of a dibasic acid having more than seven carbon atoms with two mols of a polyethylene amine, and heating the reaction mixture to drive off water overhead in an amount nearly equal to that which would be produced if all the carboxyl oxygen were converted to water, whereby to produce a bis-imidazoline, the quantity of such product being effective to substantially inhibit the corrosion of the metal equipment, and thereafter causing the well fluids to come in contact with the metal to be protected.

2. The method according to claim 1 in which the dibasic acid is phthalic acid.

3. The method according to claim 1 in which the dibasic acid is dimer acid.

4. The method according to claim 1 in which the dibasic acid is sebacic acid.

5. The method of protecting metal equipment which is subject to the corrosive action of oil well fluids which comprises adding to such fluids the product obtained by reacting one mol of a dibasic acid having more than seven carbon atoms with two mols of a polyethylene amine, heating the reaction mixture to drive off water overhead in an amount nearly equal to that which would be produced if all the carboxyl oxygen were converted to water, whereby to produce a bis-imidazoline, and at least partially neutralizing the bis-imidazoline with oleic acid, the quantity of such product being effective to substantially inhibit the corrosion of the metal equipment, and thereafter causing the well fluids to come in contact with the metal to be protected.

6. The method according to claim 5 in which the dibasic acid is phthalic acid.

7. The method according to claim 5 in which the dibasic acid is dimer acid.

8. The method according to claim 5 in which the dibasic acid is sebacic acid.

WILLIAM B. HUGHES.

References Cited in the file of this patent

UNITED STATES PATENTS

| Number | Name | Date |
|---|---|---|
| 2,466,517 | Blair | Apr. 5, 1949 |

OTHER REFERENCES

J. Org. Chem.—Mar. 1950—15—pages 241–248—J. Riebsomer.